United States Patent [19]
Tatina et al.

[11] Patent Number: 6,030,158
[45] Date of Patent: Feb. 29, 2000

[54] LOAD SECUREMENT SYSTEM FOR BOXCARS OR CONTAINERS

[75] Inventors: Richard A. Tatina, Countryside; David P. Morgan, Bartlett; Clayton Baker, New Lenox, all of Ill.

[73] Assignee: Portec Rail Products, Inc., Pittsburgh, Pa.

[21] Appl. No.: 08/831,413

[22] Filed: Apr. 1, 1997

[51] Int. Cl.⁷ ..................................................... B60P 7/08
[52] U.S. Cl. .............................. 410/100; 410/36; 410/42; 410/47; 410/97; 410/103; 410/104; 410/117
[58] Field of Search ................................ 410/34, 36, 42, 410/47, 96, 97, 100, 117, 103, 104, 105, 12; 24/68 CD, 265 CD; 248/499; 254/222, 323, 329

[56] References Cited

U.S. PATENT DOCUMENTS

| | | |
|---|---|---|
| 994,822 | 6/1911 | Daly ........................................ 410/117 |
| 2,269,286 | 1/1942 | Ott ............................................ 410/97 |
| 2,442,266 | 5/1948 | Davis . |
| 2,570,368 | 10/1951 | Moon . |
| 2,601,103 | 6/1952 | Dietrichson . |
| 2,839,013 | 6/1958 | Gunnell et al. . |
| 3,125,966 | 4/1964 | Johnson . |
| 3,202,112 | 8/1965 | Oakley . |
| 3,224,385 | 12/1965 | Elsner ..................................... 410/117 |
| 3,416,816 | 12/1968 | Spencer ................................... 410/100 |
| 3,842,755 | 10/1974 | Carr . |
| 4,020,769 | 5/1977 | Keir . |
| 4,226,465 | 10/1980 | McCullough . |
| 4,382,736 | 5/1983 | Thomas ................................... 410/104 |
| 4,464,089 | 8/1984 | Allen ........................................ 410/97 |
| 4,770,578 | 9/1988 | Coleman ................................. 410/34 |
| 4,846,610 | 7/1989 | Schoenleben ........................... 410/96 |
| 4,850,769 | 7/1989 | Matthews ............................... 410/105 |
| 5,338,136 | 8/1994 | Hetchler ................................. 410/100 |
| 5,494,387 | 2/1996 | Ruegg .................................... 410/103 |
| 5,516,245 | 5/1996 | Cassidy .................................. 410/101 |
| 5,664,918 | 9/1997 | Heider et al. ........................... 410/103 |
| 5,800,105 | 9/1998 | Stump .................................... 410/103 |
| 5,800,106 | 9/1998 | Miller ..................................... 410/117 |
| 5,899,646 | 5/1999 | Tatina et al. ........................... 410/100 |

FOREIGN PATENT DOCUMENTS 2266706  11/1993  United Kingdom ................. 410/145

OTHER PUBLICATIONS

Aeroquip Series J Cargo Control System—REB–15 Railroad Engineering Bulletin, 4 pages no date.

Primary Examiner—Stephen T. Gordon
Attorney, Agent, or Firm—Hill & Simpson

[57] ABSTRACT

A securement system for vertically upstanding articles on a platform such as paper rolls inside a boxcar includes vertical anchor channels, the anchor channels having notches along their length for setting a position of spools carried by the channels. The spools hold coiled webbing and one of the webbings includes a ratchet buckle fastener. The webbings can be uncoiled from the spools to the desired length to wrap around the vertical articles and secure the vertical articles using the fastener. In an alternative embodiment, movable elements finctioning as anchors for ends of the webs are vertically positionable along verticle anchor channels.

19 Claims, 8 Drawing Sheets

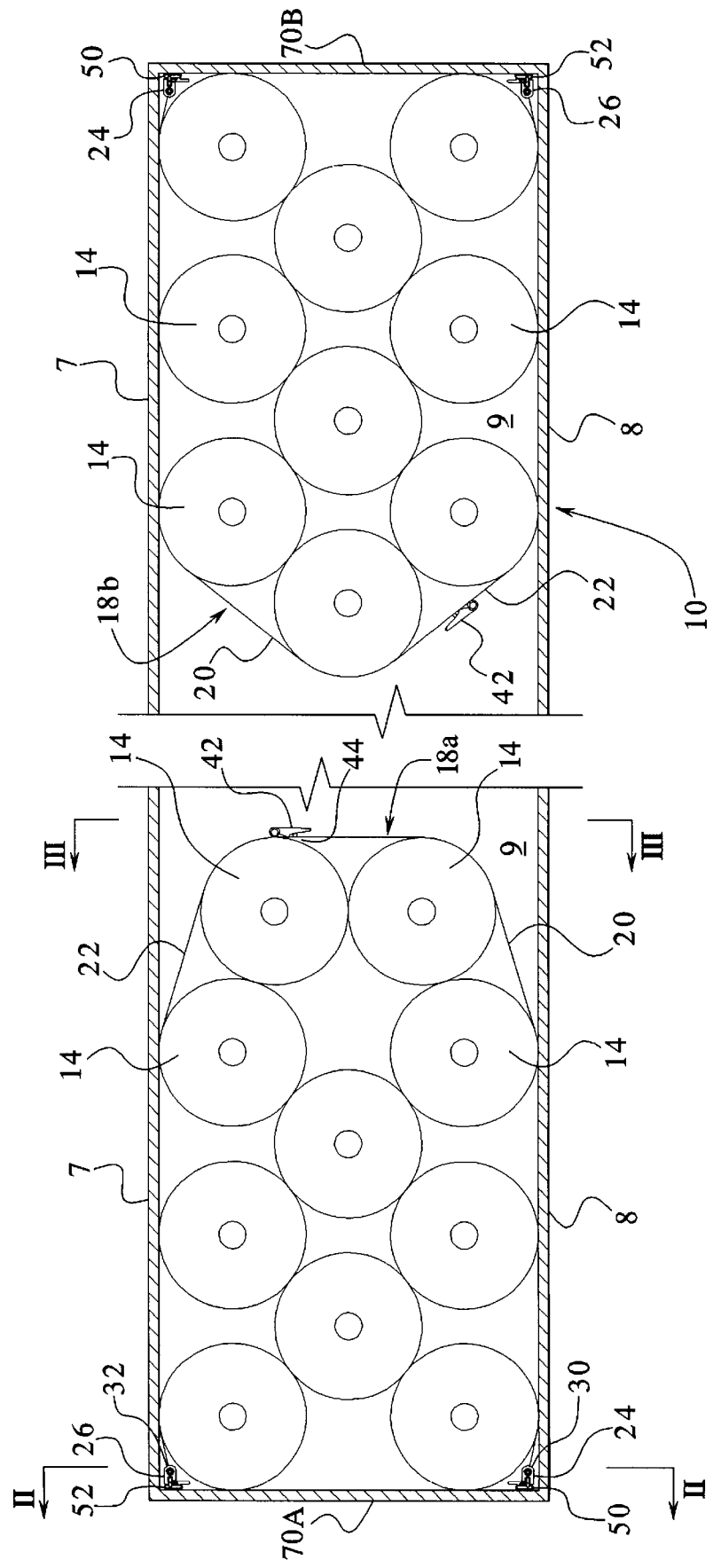

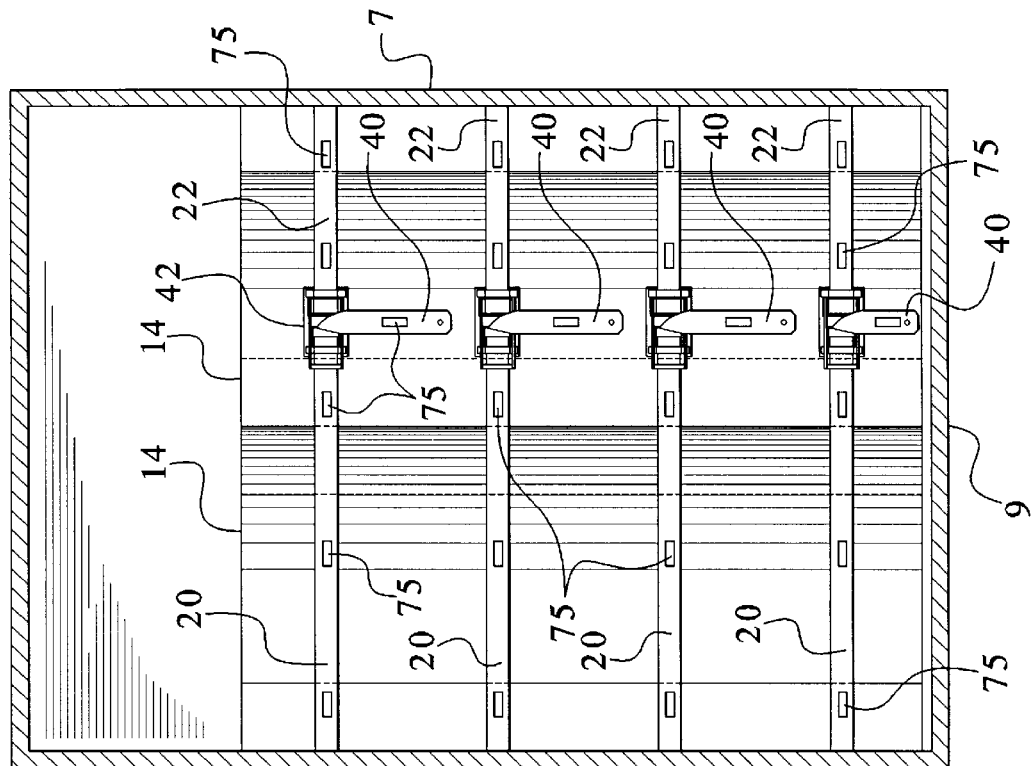
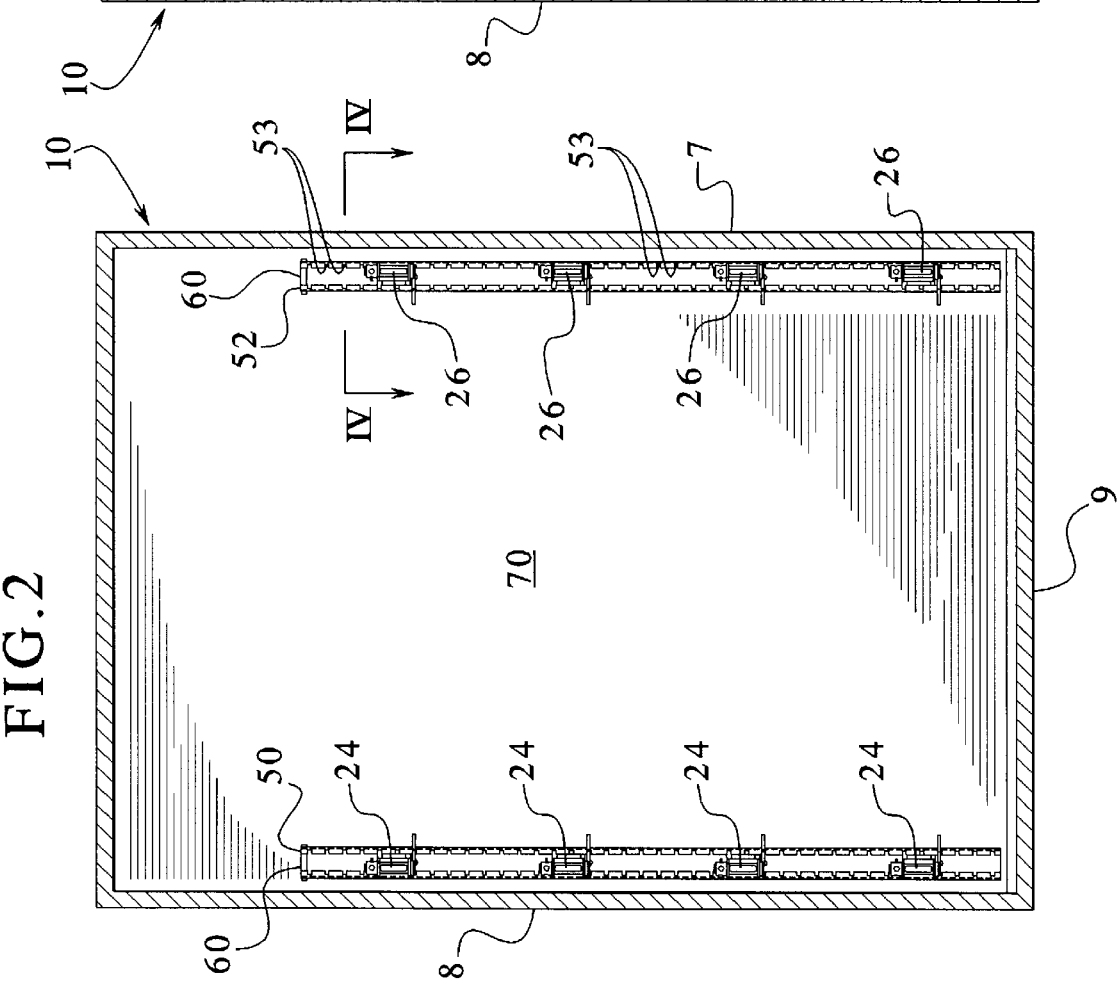

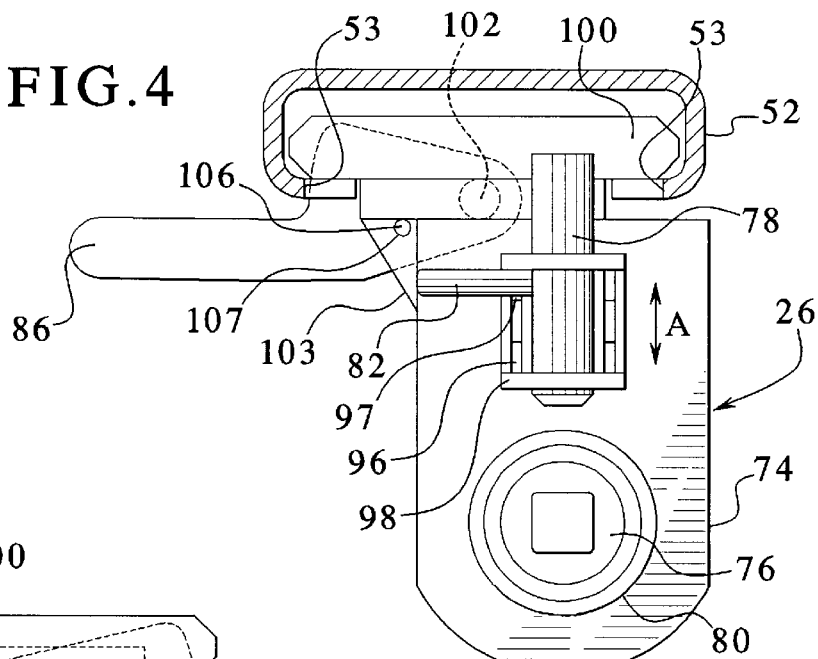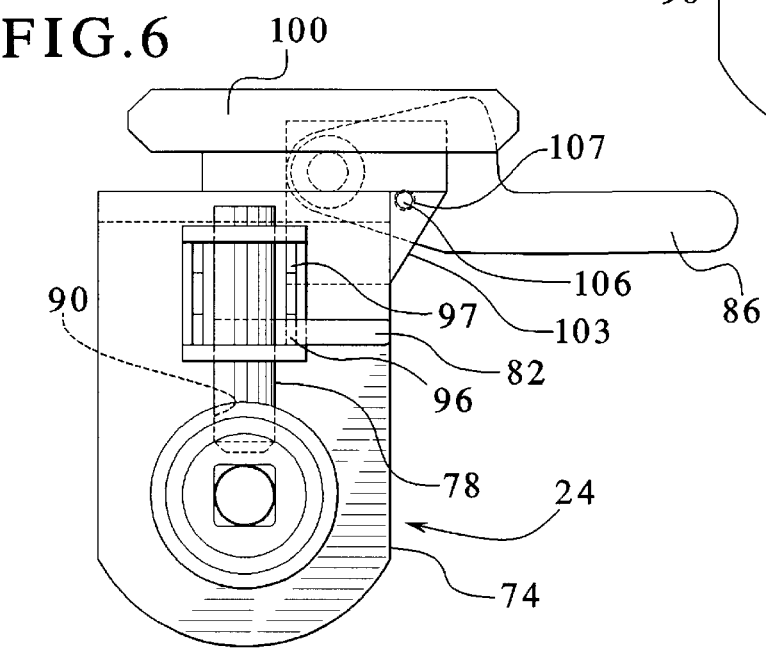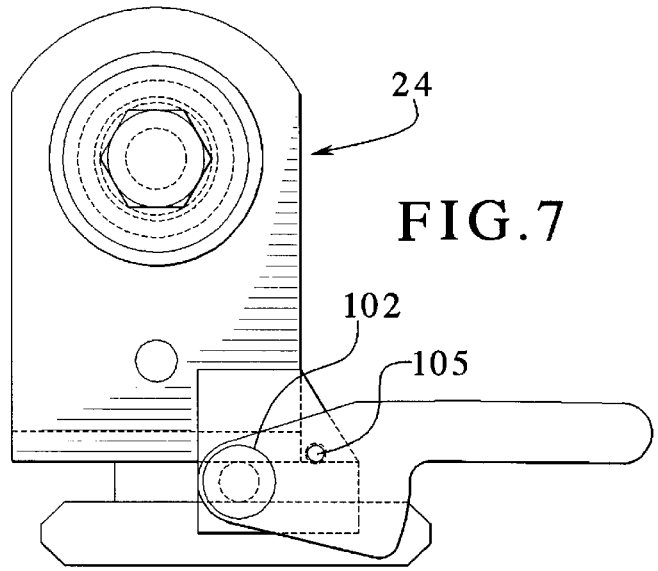

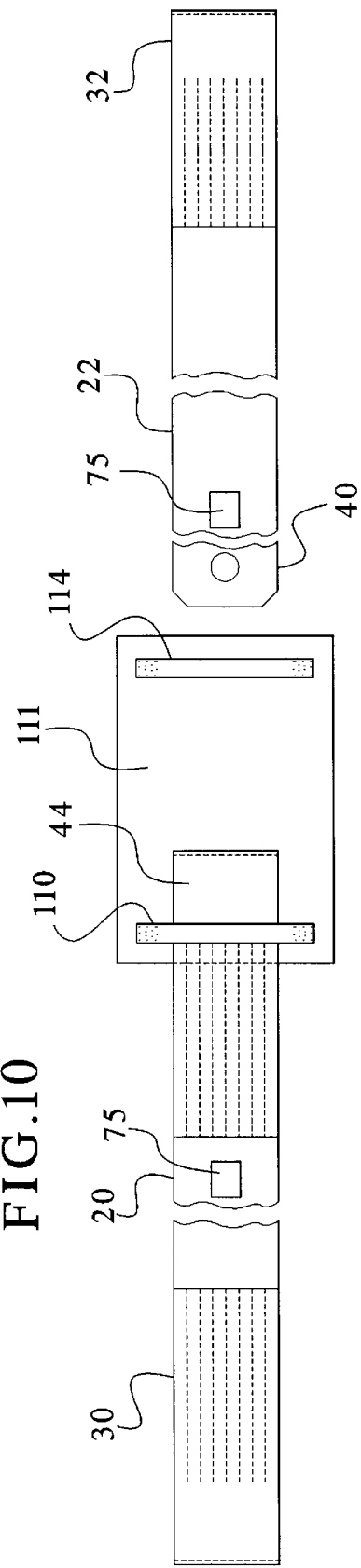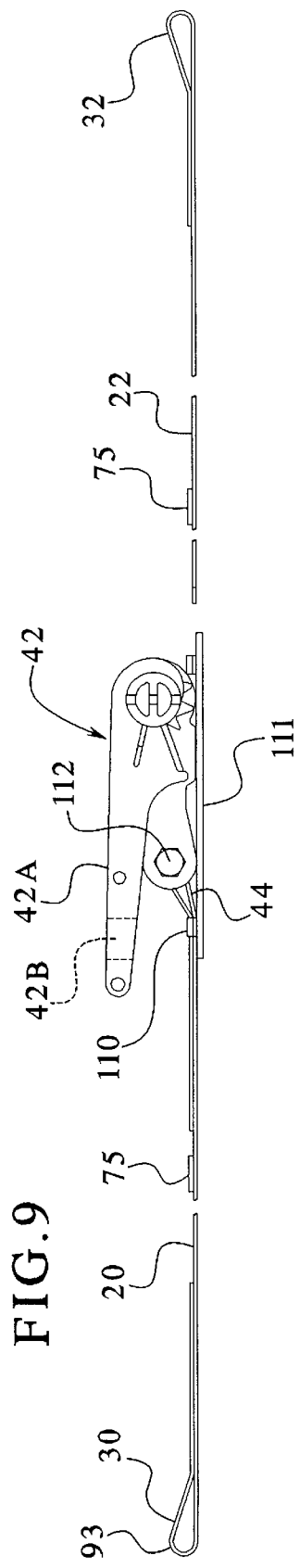

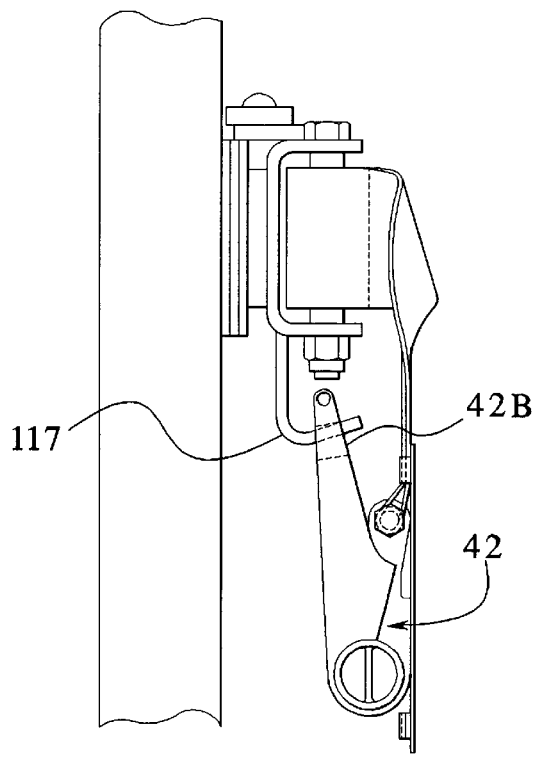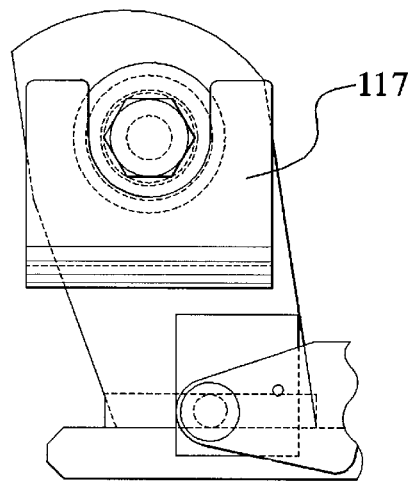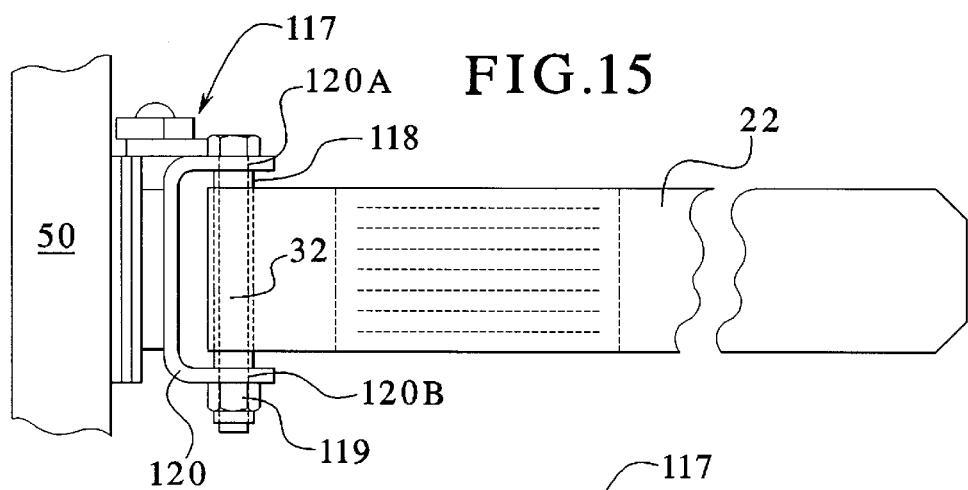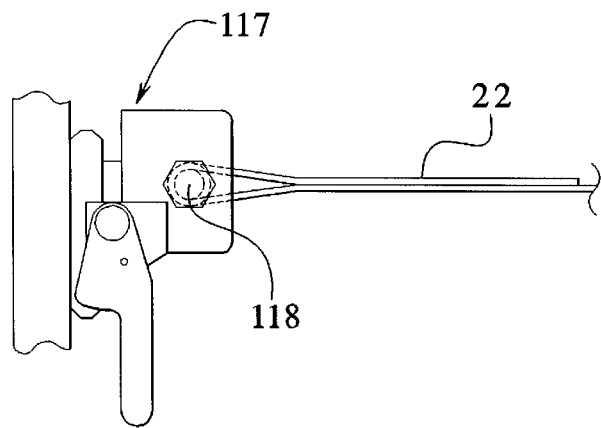

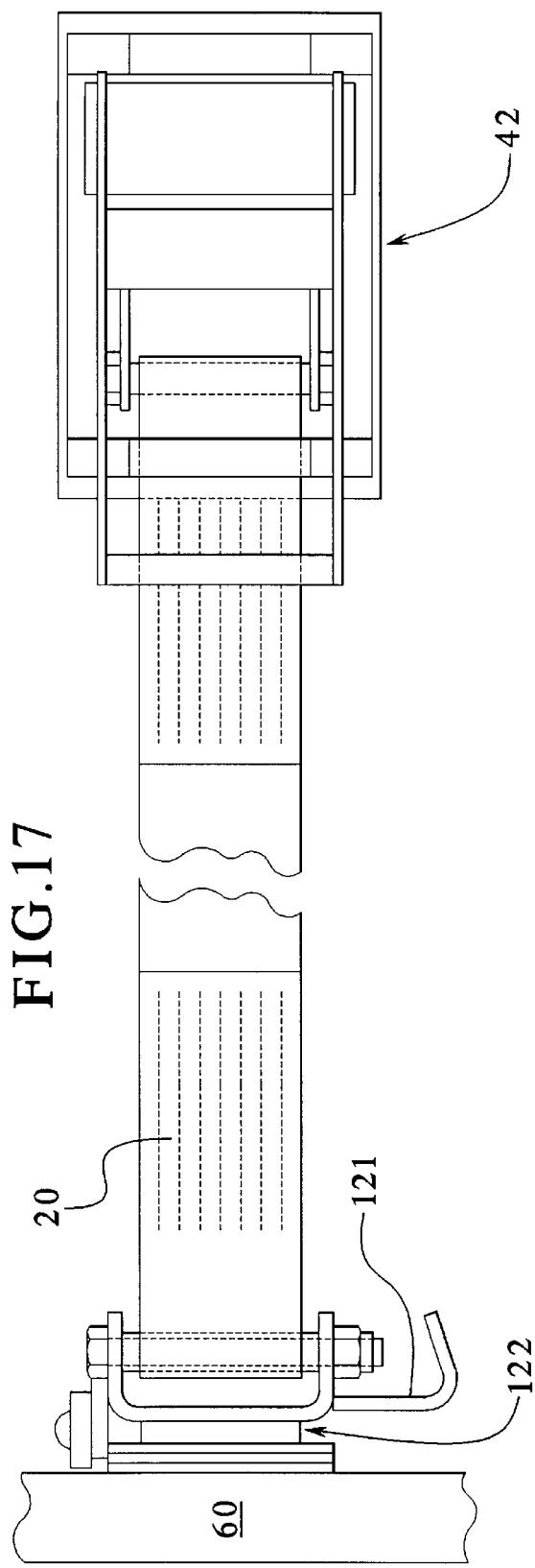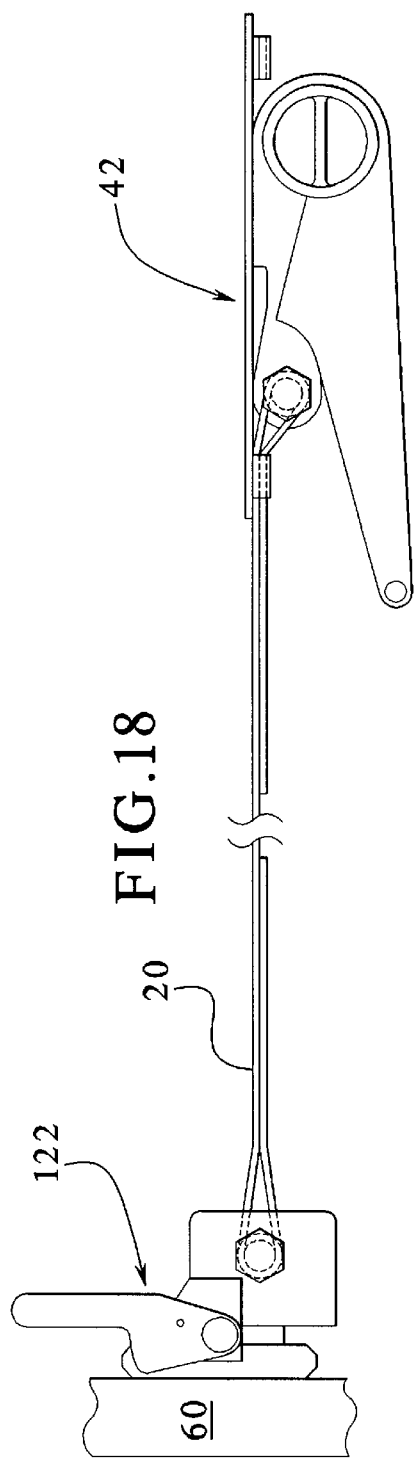

LOAD SECUREMENT SYSTEM FOR BOXCARS OR CONTAINERS

BACKGROUND OF THE INVENTION

The present invention relates to load securement on a platform such as within a railway boxcar container or vehicle, particularly a load securement system for securing large rolls of paper in boxcars.

Paper products are shipped in closed vehicles to protect the paper from environmental damage. Presently there is only one industry accepted method of securing large rolls of paper in boxcars. This method uses metal strapping as described in the Association of American Railroads pamphlet: "General Information Series No. 626", 45" Diameter, 120" wide (3 Meter) Wide Roll Printing Paper Secured by Steel Straps in Cushion Equipped Boxcars", issued Jul. 1992. According to this method, a disposable dunnage, in the form of steel strapping and seals are used to secure the paper rolls. Special strapping tools are required to tension and crimp the seals. At the unloading destination, the tension steel strapping must be cut. This has always been a dangerous task which requires much care to avoid injury to the unloading personnel.

SUMMARY OF THE INVENTION

An object of the invention to provide a safe, simple and efficient method to ship cargo on a platform, such as three meter length rolls of paper in boxcars. It is an object of the invention to provide a securement system which maintains the strapping or webbing in an orderly position when not in use and which is easily deployed for securing cargo. It is an object of the invention to provide a securement system which is vertically adjustable to horizontally hold vertically arranged cargo at precise vertical positions on the cargo. It is an object of the invention to provide a securement system which eliminates costly disposable dunnage which must be disposed at environmentally approved sites. It is an object of the invention to eliminate the use of tools for securing commodities.

It is an object of the invention to distribute the in-transit forces of a securement system on the cargo over more area on the cargo, thereby reducing possible damage to the commodity. It is an object of the invention to eliminate injury caused by severed sharp steel strapping. It is an object of the invention to provide a strapping or webbing which is three times stronger than the presently used steel strap.

It is an object of the invention to provide an adjustable strapping system which can be tensioned easily. It is an object of the present invention to provide a securement system which reduces necessary labor to secure loads. It is an object of the present invention to provide a versatile strapping system which can be used to secure many different types of commodities.

The objects are achieved with a new apparatus comprised of a vertically adjustable webbing anchor/spool installed in notched channels mounted in the four corners of a platform such as a boxcar or other vehicle, container or transport platform and to each of which is attached a 4" wide webbing. The 4" webbing provides an 83% increase in contact area on the cargo to reduce damage. For each matching pair of webbings, one of the webbings holds a tensioning device such as a ratchet buckle and the other corresponding opposite webbing has a plain end for gripping by the ratchet buckle. The webbing anchor/spool acts to anchor the webbings to the ends of the boxcar when paper rolls are secured and doubles as a spool to store the webbing when not in use.

The web anchor/spool is installed in a notched channel which allows vertical adjustment to accommodate optimum restraint locations for various commodities. The anchor/spool includes a mandrel for winding up the webbing when not in use. A pivoting lock is located on the end of the web anchor/spool which manually engages the notches of the anchor channel to maintain the device at the required height. At an opposite end of the web anchor/spool is a bolt lock which engages a mandrel hub to keep the webbing from unwinding during non-use and for adjusting the in-use length of the webbing.

The webbing can have flat, flexible magnets affixed to one side to allow the webbing to be stowed out of the way such as on a boxcar wall while commodity is being loaded into the platform. Prior to loading the boxcar, for example, the webbings are unwound from the web anchor/spools and affixed to the walls of the boxcar at a predetermined height corresponding to the particular commodity being loaded. After the boxcar is loaded the plain end webbings are inserted into the slot of a mandrel of the ratchet buckle and tension applied to the webbing using the ratchet buckle handle. At the destination, the tension is relieved and the webbing is removed from the ratchet buckle. After the commodity has been unloaded, the webbings are wound up on the web anchor/spool and the bolt lock is applied to the mandrel hub.

In one of the embodiments of the invention hooks are provided on an outside surface of a side wall of the container near a door thereof so that prior to loading the container, the webs or belts of the invention having the ratchet buckle end can be secured in position with the hooks at the outside surface of the side wall.

In another improvement of the invention, a hook may be provided on the spindles so that the ratchet buckle end can be hung from these hooks for storing the ratchet buckles when the container is not loaded and the webs are wound on the spindles.

In an alternate embodiment of the invention rather than rotatable spindles, a solid anchor is provided which is attached to a vertically movable and positionable anchor unit.

Other objects and advantages of the present invention will be apparent upon reference to the accompanying description when taken in conjunction with the following drawings.

BRIEF DESCRIPTION OF THE DRAWINGS

FIG. 1 is a top plan view of a container with roof removed showing a load securement system of the present invention;

FIG. 2 is a sectional view taken generally along line II—II of FIG. 1 with cargo removed for clarity;

FIG. 3 is a sectional view taken generally along line III—III of FIG. 1;

FIG. 4 is a sectional view taken generally along line IV—IV of FIG. 2;

FIG. 6 is a top plan view of the anchor spool shown in FIG. 5;

FIG. 7 is a bottom view of the anchor shown in FIG. 5;

FIG. 9 is a bottom view of a webbing assembly of FIG. 1;

FIG. 10 is an elevational view of the webbing of FIG. 9 with a buckle thereof removed for clarity;

FIGS. 14A and 14B are detailed side and bottom views of the hooks shown in FIG. 13; and FIGS. 15 and 17 are side views and FIGS. 16 and 18 are top views of an alternate embodiment of the invention wherein rotatable spindles are not employed, but rather a solid anchor is provided to a vertically movable and positionable anchor unit.

DETAILED DESCRIPTION OF THE PREFERRED EMBODIMENTS

Figure 8:
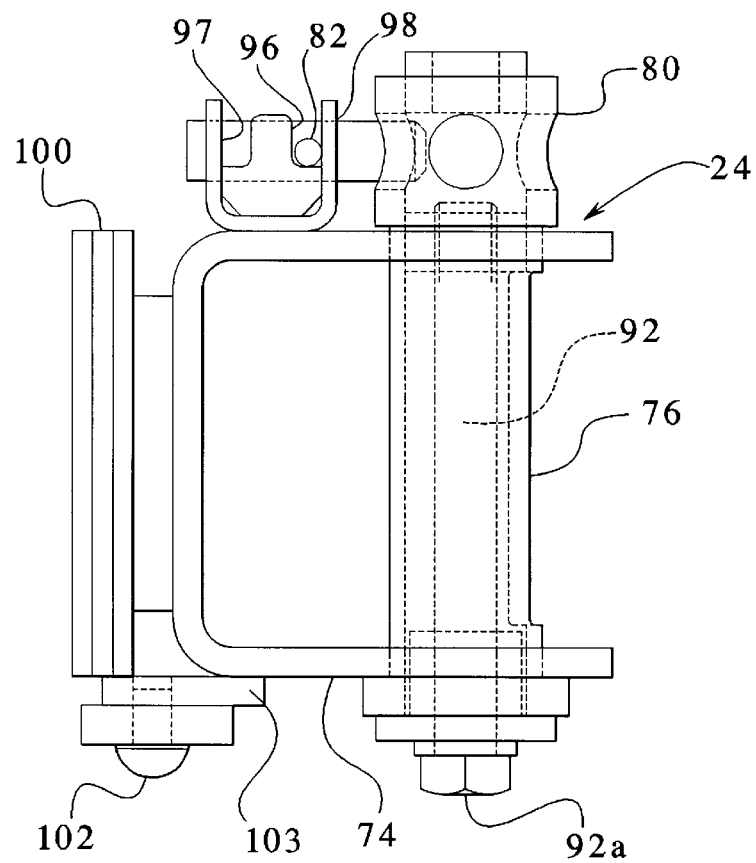
FIG. 8 is a left side view of the anchor spool shown in FIG. 5.

FIG. 1 illustrates a container 10 such as a boxcar, holding a plurality of paper rolls 14, vertically arranged and nesting on a floor or platform 9. The paper rolls are typically 45" to 50" in diameter, three meter tall paper rolls. The rolls are arranged in a ten roll pattern on the left side of FIG. 1 and a nine roll pattern on the right side of FIG. 1. A securement system 18a, 18b are provided to secure the rolls 14 in a vertical orientation. Each securement system 18a, 18b includes a first flexible belt or webbing 20, a second webbing 22, spools 24, 26 and ratchet buckles 42.

FIG. 2 shows the mounting of the spools 24, 26. The spools 24, 26 are held partially within anchor channels 50, 52 respectively. Each anchor channel 50, 52 holds a plurality of the vertically arranged spools 24, 26 respectively. Each spool 24, 26 holds belts or webbings 20, 22 as shown in FIG. 2. The anchor channels 50, 52 are substantially identical, having a shallow C-shaped in cross section with a plurality of slots 53 along a length thereof on a front portion of the C-shape. Thus the spools 24, 26 can be selectively positioned along the length of the channels 50, 52 vertically. A bolt and nut arrangement 60 is threaded through the channels 50, 52 at a top end thereof to prevent removal of the spools 24, 26 from the channels once installed.

The channels 50, 52 are mounted to a respective end wall 70A, 70B of the container 10 perpendicular to the floor 9, although mounting on the sidewalls 7, 8, or other mounting is encompassed by the invention.

Figure 5:
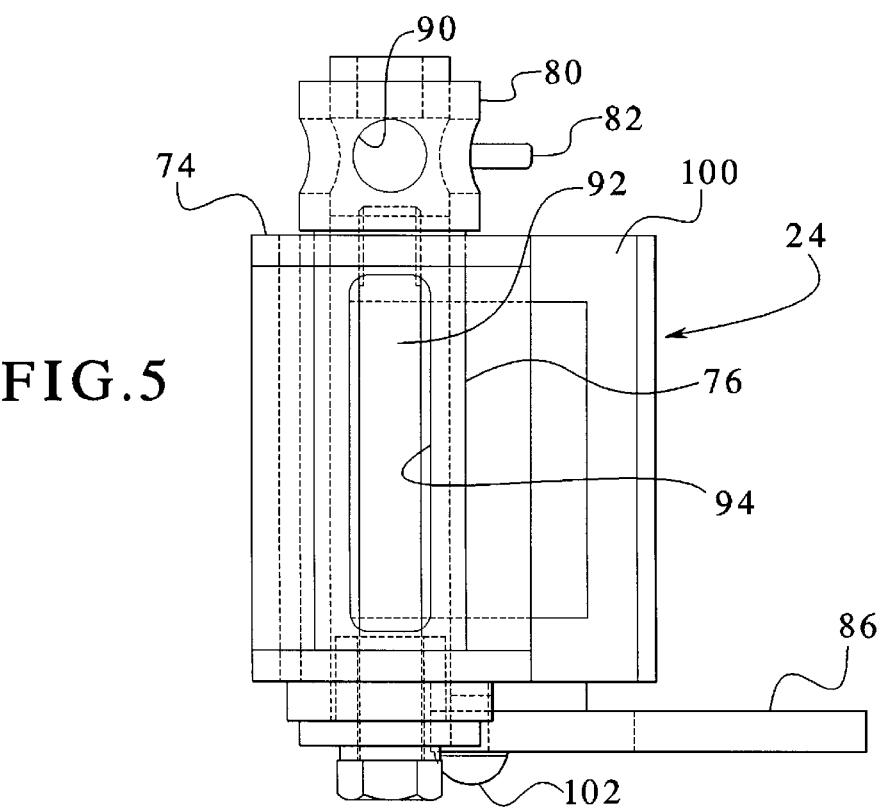
FIG. 5 is an elevational view of a spool anchor shown in FIG. 1.

FIG. 4 illustrates the spool 26 of the present invention engaged into the anchor channel 52. It should be noted that the spools 24, 26 are identical except for parts 86, 103 (described below) configured in mirror image fashion for right hand or left hand operation (compare FIG. 4 to FIG. 6). The spool includes a C-shaped frame part 74 (see FIG. 8) holding a rotatable spindle 76 for holding the belts 20, 22 wrapped therearound. A slidable lock pin 78 is shown in a retracted position but which can be moved in a direction A to engage into an aperture in a tool part 80 of the spindle 76 which protrudes upwardly of the frame 74. This is shown for example in FIG. 5. A grippable bolt 82 fixed to the retractable pin 78 is used to lock the retractable pin 78 in an nonengageable or engaged position. A spool lock 86 is provided to lock the spool 26 to the anchor channel 52 at the select slots 53 to set the vertical level of the spool 26.

Flat, flexible magnets 75 are arranged on one side of each webbing 20, 22. The magnets allow the webbing to be secured in a generally horizontal attitude onto the sidewall of the container during loading, to keep the webbing out of the way and in ready position for securing the load. The buckle end 44 of the webbing 20 can also be secured with a hook or other element on an outer side of the sidewall 7 or 8 by wrapping the webbing 20 around the edge of the container door and then to the hook.

FIGS. 5–8 illustrate the spool 24 of the present invention in more detail. The spool 24 includes the tool part 80 having a plurality of apertures 90 arranged at for example 90° points around the tool part 80. Within the frame 74 is located a shaft 92, such as a threaded bolt, for receiving a loop 93 of the webbing 20 and surrounding the shaft is the spindle 76 which receives wrapped therearound the coiled webbing 20. The spindle 76 includes a slot 94 for insertion of the webbing 20 into the spindle 76 to be engaged by the shaft 92. The shaft 92 is threaded into the tool part 80 and can be retracted axially of the spindle 76 by turning a hexagon end 92a of the shaft while holding stationary the tool part 80. When unscrewed from the tool part 80 the shaft can be withdrawn downwardly. The loop 93 can be inserted into the slot and then the shaft inserted to be captured into the loop 93, and the shaft rescrewed into the tool part 80.

The tool part 80, the spindle 76 and the shaft 92 rotate axially within the frame 74 to wind or unwind the webbing 20. The length of the webbing 20 can be changed by winding more or less of the webbing 20 on the spindle 76. Preferably during non-use, the webbing is completely wound onto the spindle 76. For winding or unwinding the spindle 76, a tool can be provided (not shown) for engaging, for example, by engaging the hexagon end 92a.

The position of the spindle 76 can be locked by extending the locking pin 78 in the direction A as shown in FIG. 4 (retracted) and FIG. 6 (extended) to engage into one of the apertures 90. The retractable pin 78 is locked in its forward position such as shown in FIG. 8 by positioning the bolt 82 within a forward slot 96 of a locking frame 98. The locking frame 98 is secured to the C-shape frame 74. The pin 78 is slidable along the direction A, and pivotable about its axis, guided by the locking frame 98. A rear slot 97 holds the bolt 82 and the retractable pin 78 in a disengaged position. To shift positions, the bolt 82 is pivoted out of the slots 96, 97 to move along the direction A and then pivoted down into one of the respective slots 96, 97.

Attached at a backside of the C-shaped frame 74 is a base plate 100 which slides within the anchor channel 50. The locking lever 86 is pinned with a button head rivet 102 to an extension 103 of the frame 74 to rotate with respect thereto. The lever 86 is of a thickness to interfit within the slots 53 of the anchor channels 50. A ball plunger 105 can be installed in the lever 86. The plunger includes a spring loaded ball 106 facing the extension 103. The ball 106 registers with a hole 107 in the extension 103 when the lever is in the engaged orientation and resiliently holds the lever securely in that position during transit, against transit vibration influences.

FIG. 9 illustrates the webbing 20 having looped end 30 and webbing 22 having looped end 32. The looped ends 30, 32 for receiving the shafts 92 of the spools 24, 26. The webbing 22 has the plain end 40. Flexible magnets 75 are arranged along the webbings intermittently for sticking the webbings 20, 22 to the container (boxcar) walls during loading. The ratchet buckle 42 permits tightening of the webbing 22 around the cargo. Ratchet buckles are commercially known for example. Aeroquip Series J Cargo Control System, Railroad Engineering Bulletin REB-15, Part No. 490301-16, or from U.S. Pat. No. 5,494,387.

FIG. 10 illustrates the webbing 20 inserted through a first guide narrow sewn strap slot bracket 110 formed on a woven material protector 111 and looped around an axle bolt 112 (shown in FIG. 9). At an opposite end of the roll protector is a second guide slot 114 for receiving the plain end 40 of the webbing 22 for engagement by the tightening ratchet of the ratchet buckle 42. Advantageously the webbings 20, 22 are 4" wide polyester straps 21 ft long and 30 ft long respectively, with a 20,000 pound minimum break strength. The roll protector has a length running in the strapping direction of 12 inches and a height of 8 inches.

Figure 11:
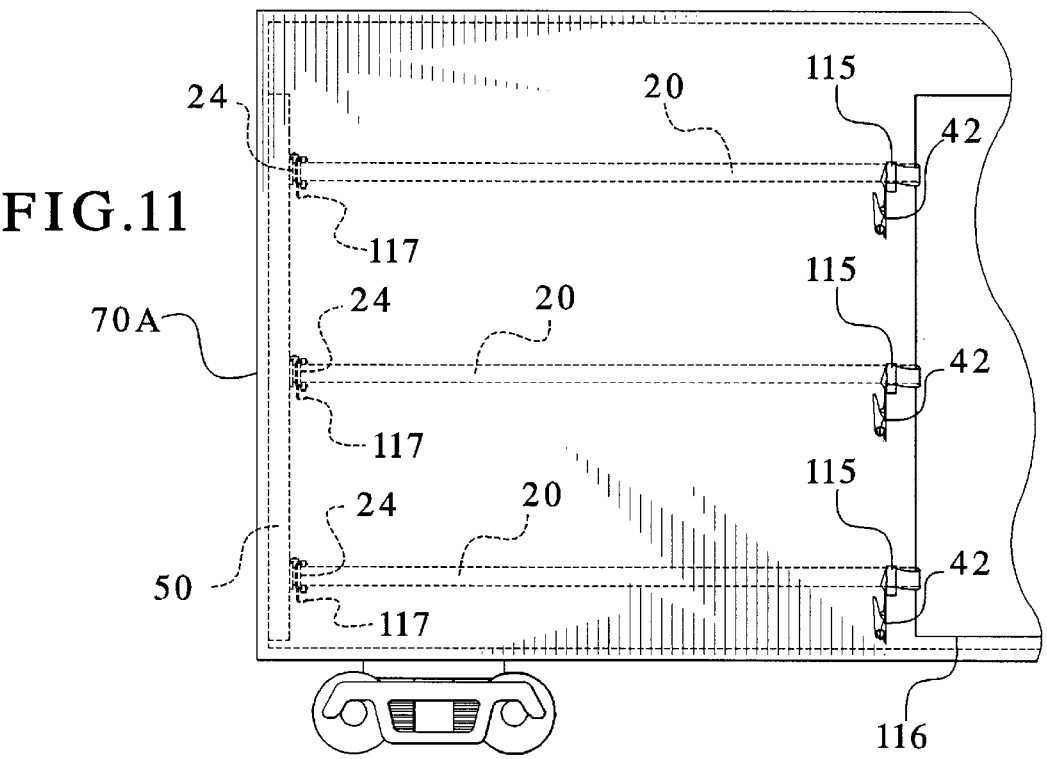
FIG. 11 is a side view from an outside of the container prior to loading with the webs or belts of the invention having the ratchet buckle end secured in position to an outside sidewall of the container near a door thereof prior to use.

FIG. 11 shows a system for retaining the belts 20 in a stored position prior to loading the container such that they are closely strung along sidewalls of the container with the ratchet buckles 42 hung from hooks 115. Preferably the hooks 115 are positioned near the doorway 116 on an outer surface of the sidewall of the container.

Figure 12:
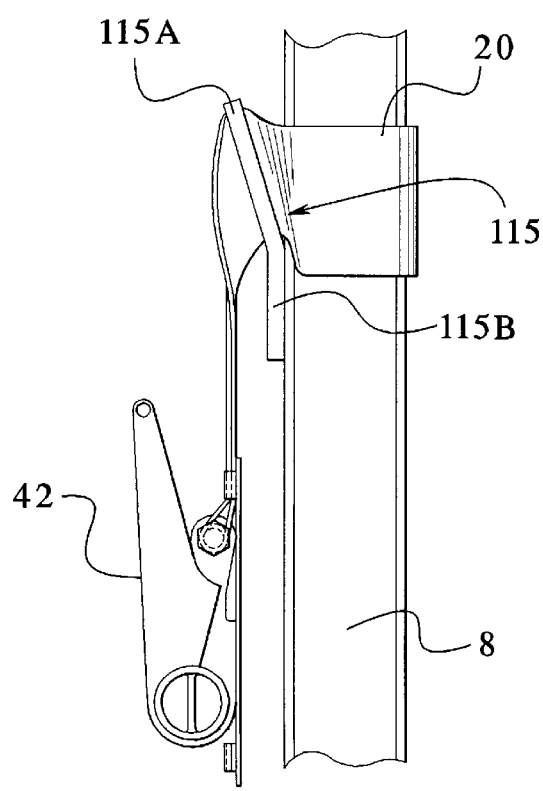
FIG. 12 is a detailed view of a holding clip shown in FIG. 11 for retaining the ratchet buckle end of the webs in position prior to loading.

A detailed view of the ratchet buckle ends of the webs slung over the hook 115 as shown in FIG. 12. As shown there, a bent out portion 115A of the hook 115 is integral with and bent off from a mounting portion 115B which is mounted to the outer side of the container wall 8.

Figure 13:
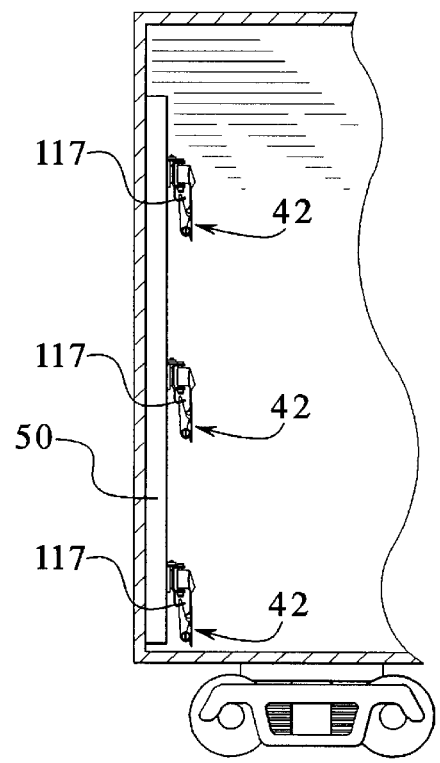
FIG. 13 is a side fragmentary view of the container showing the ratchet buckle end of the webs with the webs substantially entirely wound on the spindles and with the ratchet buckle ends hung from hooks for storing the ratchet buckles when the container is not loaded.

FIG. 13 shows a preferred positioning of the belts 20 fully wound on the respective spindles and with the respective ratchet buckles 42 hung from respective hooks 117 attached to bottoms of the spools 24. As shown in FIGS. 14A and 14B, the hooks 117 engage with an aperture 42B provided in the handle 42A (see also FIG. 9) of the ratchet buckle 42.

FIG. 15 is a side view of a right-hand version of an alternate embodiment of the invention wherein a movable and vertically positionable anchor 117 is provided having a C-shaped frame part 120 having upper and lower apertures 120A and 120B receiving a bolt 118 and corresponding nut 119. The shaft portion of the bolt 118 passes through the looped end 32 of the webbing 22 to secure it in position. As was the case with the previously described vertically positionable spools, the anchor 117 is also vertically positionable in the same manner as previously described for the spools along channel 50. The remainder of the anchor 117 has a design similar to the spools previously described relative to the locking arrangement for positioning the anchor at different verticle positions along the channel 50.

FIG. 16 is a top view showing the right-handed version of the anchor arrangement shown in FIG. 15.

FIGS. 17 and 18 are respective side and top views of a left-handed version of the anchor assembly shown in FIGS. 15 and 16 wherein a vertically positionable anchor 122 is provided for movement along a corresponding channel 16. The anchor 122 also has a hook 121 at the bottom thereof for engaging with the handle of the ratchet buckle 42 to conveniently store the ratchet buckle 42 adjacent the movable anchor 122 when the web 20 and buckle 42 are not in use.

In the embodiment shown in FIGS. 15, 16, 17, and 18, the locking handle for verticle positioning of the anchor along the vertical channel is shown at the top, whereas in the first embodiment shown in FIGS. 1–14 the locking handle is at the bottom of the vertically movable and positionable spools.

As is apparent from the foregoing specification, there are various alterations and modifications of the disclosed embodiment which may differ from those what has been described in the preceding specification and description. It should be understood that we wish to embody within the scope of the patent warranted hereon, all such modifications as reasonably and properly come within the scope of our contribution to the art.

We claim as our invention:

1. A securement system for securing articles resting on a platform, comprising:
    a first spool holding a coiled length of flexible material web which is dispensable from said spool;
    a first vertically elongate channel mounted perpendicularly to said platform and shaped for receiving said spool slidably therein, said spool having a positioning lock for fixing an elevation of said spool with respect to said vertically elongate channel; and
    said web dispensable from said spool for at least partially wrapping said articles for securement relative to said platform.

2. The securement system according to claim 1 wherein said vertically elongate channel comprises notches formed incrementally located along a length thereof, and said spool positioning lock comprises a portion for interengagement within a select one of said notches.

3. The securement system according to claim 2 wherein said first spool comprises a spindle for coiling said flexible web within said first spool and a spool frame for rotatably holding said spindle, and said spool positioning lock comprises a lever pinned to said frame and rotatable into position to be received into said notch.

4. The securement system according to claim 1 wherein said first spool comprises a spindle for coiling said flexible web within said first spool and a spindle lock having a portion for engaging said spindle to prevent rotation thereof.

5. The securement system according to claim 1 further comprising a second vertically elongate channel spaced from the first channel and arranged across a width of said platform opposite the first channel, and a second spool arranged on said second vertically elongate channel, said second spool having a further flexible web coiled thereon, and one of said first web and said second webs comprising a buckle for fastening the first web and second web together.

6. The securement system according to claim 5 further comprising third and fourth spools arranged on said first and second vertically elongate channels respectively below said first and second spools, and third and fourth flexible webs arranged on said third and fourth spools respectively and a fastener attached to one of said third and fourth webs for connecting said third and fourth webs together.

7. The securement system according to claim 5 wherein one of said first and second webs comprise magnets attached thereon for holding of said first and second webs elevated during loading of said platform.

8. The securement system according to claim 1 wherein said flexible web comprises polyester.

9. The securement system according to claim 1 wherein sidewalls are provided running parallel along opposite sides of the platform and an end wall is provided at at least one end of the platform, and wherein a second vertically elongate channel is also provided mounted perpendicular to said platform and shaped for receiving a second spool slidably therein, said second spool having a spool positioning lock for fixing an elevation of said second spool with respect to said second vertically elongate channel, and wherein the first and second elongate channels are mounted at opposite vertical side edges at an inside of said end wall.

10. The securement system according to claim 9 wherein at least one hook is provided at a distance spaced from said first elongate channel at an outside surface of one of the sidewalls near a doorway of the container for holding an end of the web when it has been substantially unwound from said first spool and which passes around an edge of the doorway to the hook.

11. The securement system according to claim 10 wherein the end of the web secured at said hook has a buckle thereat hanging from said hook.

12. The securement system according to claim 1 wherein the first spool has a hook at a bottom thereof and wherein the web has at an end thereof a buckle, and wherein the buckle is hung from the hook.

13. A securement system for securing articles resting on a platform, comprising:
   a first spool having a first frame holding a first rotatable spindle, said first spindle having a vertical axis, said frame being mounted at an elevated position relative to said platform;
   a first supply of a flexible material web coiled on said first spindle and dispensed from said spool upon rotation of said first spindle;
   means for securing the first frame to said platform; and
   means for tensioning said flexible web onto said articles.

14. The securement system according to claim 13 further comprising a second spool having a second frame holding a second rotatable spindle, said second spindle having a vertical axis, said second frame being mounted at an elevated position from said platform, and a second supply of flexible web coiled on said second spindle and dispensed from said second spool, a free end of said first supply of flexible web connectable to a free end of said second supply of flexible web.

15. A securement system according to claim 14 wherein said means for tensioning comprises a ratchet buckle between said free ends of said first and second flexible webs.

16. A securement system for securing articles resting on a platform, comprising:
   a first vertically movable element comprising a spool with a rotatable spindle to which is attached a first end of a flexible material web with the web being coiled on the spindle;
   a first vertically elongate channel mounted perpendicular to said platform and shaped for receiving said first vertically movable element slidably therein to permit vertical movement thereof, said first vertically movable element having a positioning lock for fixing elevation of said movable element with respect to said first vertically elongate channel; and
   said web having a free end for at least partially wrapping said articles when uncoiled from the spindle for securement relative to said platform.

17. A securement system according to claim 16 wherein a second movable element attached to a first end of a second flexible material web and having a spool with a rotatable spindle with the second web coiled on the second movable element spindle is provided together with a second vertically elongate channel mounted perpendicular to said platform and shaped for receiving said second element slidably therein, said second element having a positioning lock for fixing an elevation of said second movable element with respect to said second vertically elongate channel, and an opposite end of the second web being attachable to an opposite end of said first web with an attachment mechanism when the second web is uncoiled from the second movable element spindle.

18. The securement system according to claim 17 wherein the attachment mechanism comprises a ratchet buckle.

19. The securement system according to claim 16 wherein the first movable element comprises a C-shaped frame member having first and second apertures therein and a bolt received through said apertures and also through a loop in said first end of said web for anchoring the web to the movable element.

* * * * *